US012349140B2

(12) United States Patent
Zhang et al.

(10) Patent No.: US 12,349,140 B2
(45) Date of Patent: Jul. 1, 2025

(54) SIDELINK TRANSMISSION AND RECEPTION METHODS AND APPARATUSES

(71) Applicant: FUJITSU LIMITED, Kawasaki (JP)

(72) Inventors: Jian Zhang, Beijing (CN); Xin Wang, Beijing (CN); Pengyu Ji, Beijing (CN); Guorong Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 370 days.

(21) Appl. No.: 17/955,657

(22) Filed: Sep. 29, 2022

(65) Prior Publication Data
US 2023/0012983 A1   Jan. 19, 2023

Related U.S. Application Data

(63) Continuation of application No. PCT/CN2020/083889, filed on Apr. 9, 2020.

(51) Int. Cl.
*H04W 72/25* (2023.01)
*H04W 72/20* (2023.01)

(52) U.S. Cl.
CPC ........... *H04W 72/20* (2023.01); *H04W 72/25* (2023.01)

(58) Field of Classification Search
CPC . H04W 4/40–48; H04W 72/02; H04W 72/04; H04W 72/0453; H04W 72/12; H04W 72/121; H04W 72/1263; H04W 72/20; H04W 72/25; H04W 72/40; H04W 92/18
See application file for complete search history.

(56) References Cited

U.S. PATENT DOCUMENTS

| 2020/0029318 | A1 | 1/2020 | Guo |
| 2022/0159620 | A1 | 5/2022 | Yang |
| 2023/0247587 | A1* | 8/2023 | Lee ........................ H04W 72/20 370/329 |

FOREIGN PATENT DOCUMENTS

| CN | 105992187 A | 10/2016 |
| CN | 109845373 A | 6/2019 |
| EP | 3 417 669 A1 | 12/2018 |
| EP | 3 417 669 B1 | 12/2018 |
| JP | 2023-517465 A | 4/2023 |

(Continued)

OTHER PUBLICATIONS

Son et al., "Method and Apparatus for Reporting Channel State Information for Sidelink Communication," English machine translation of KR 2021/0113035, Clarivate Analytics, pp. 1-23 (Year: 2025).*

(Continued)

*Primary Examiner* — Thomas R Cairns
(74) *Attorney, Agent, or Firm* — Myers Wolin, LLC

(57) ABSTRACT

A sidelink transmission and reception methods and apparatuses. The sidelink transmission method includes transmitting first sidelink control information via a physical sidelink control channel; and transmitting second sidelink control information and a first transport block via a physical sidelink shared channel, wherein the first sidelink control information or the second sidelink control information or a media access control protocol data unit of the first transport block indicates or carries triggering information used for triggering a second terminal equipment to report sidelink resource information.

19 Claims, 7 Drawing Sheets

(56) References Cited

FOREIGN PATENT DOCUMENTS

| KR | 20210113035 A | * | 9/2021 | ............ | H04W 72/23 |
|---|---|---|---|---|---|
| WO | 2016/163972 A1 | | 10/2016 | | |
| WO | 2017/140364 A1 | | 8/2017 | | |
| WO | 2021/109358 A1 | | 6/2021 | | |

OTHER PUBLICATIONS

Notice of Reasons for Refusal issued by the Japan Patent Office for corresponding Japanese Patent Application No. 2022-560523, mailed on Sep. 19, 2023 with an English translation.

International Search Report and Written Opinion of the International Searching Authority issued by the China National Intellectual Property Administration for corresponding International Patent Application No. PCT/CN2020/083889, mailed on Dec. 23, 2020, with an English translation.

LG Electronics, "Discussion on resource allocation mechanism for NR V2X", Agenda item: 7.2.4.1.4, 3GPP TSG-RAN WG1 Meeting #95, R1-1812844, Spokane, USA, Nov. 12-16, 2018.

Extended European Search Report with Supplementary European Search Report and the European search opinion Issued by the European Patent Office for corresponding European Patent Application No. 20930441.9-1216, mailed on May 8, 2023.

Intel Corporation, "Summary for AI 7.2.4.2.2 Mode-2 Resource Allocation", Agenda Item: 7.2.4.2.2, 3GPP TSG-RAN WG1 Meeting #96bis, R1-1905717, Xi'an, China, Apr. 8-12, 2019.

First Notification of Office Action and Search Report issued by the China National Intellectual Property Administration for corresponding Chinese Patent Application No. 202080098585.9, mailed on Jun. 19, 2023, with an English translation.

Notice of Preliminary Rejection issued by the Korean Intellectual Property Office for corresponding Korean Patent Application No. 10-2022-7034387 mailed on Feb. 25, 2025, with an English translation.

Huawei et al., "Remaining details of physical layer procedures for sidelink", Agenda item: 7.2.4.5., 3GPP TSG RAN WG1 Meeting #100-e, R1-2000187, Feb. 24-Mar. 6, 2020.

Interdigital Inc., "Remaining Issues on Physical Layer Procedures for NR V2X", Agenda item: 7.2.4.5., 3GPP TSG RAN WG1 #100, R1-2000837, e-Meeting, Feb. 24-Mar. 6, 2020.

Huawei et al., "Sidelink resource allocation mode 1", Agenda item: 7.2.4.2.1., 3GPP TSG RAN WG1 Meeting #99 R1-1911883, Reno, USA, Nov. 18-22, 2019.

Lenovo et al., "Discussion on physical layer procedures for NR sidelink", Agenda item: 7.2.4.5., 3GPP TSG RAN WG1 #98 R1-1908733, Prague, CZ, Aug. 26-30, 2019.

\* cited by examiner

SIDELINK TRANSMISSION AND RECEPTION METHODS AND APPARATUSES

CROSS-REFERENCE TO RELATED APPLICATION

This application is a continuation application of International Application PCT/CN2020/083889 filed on Apr. 9, 2020, and designated the U.S., the entire contents of which are incorporated herein by reference.

TECHNICAL FIELD

This disclosure relates to the field of communication technologies.

BACKGROUND

V2X (Vehicle to Everything) is a vehicle communication technology. Compared with the cellular communication using Uu link (including uplink and downlink), a transmitting device of V2X communicates directly with a receiving device via a sidelink.

New Radio (NR) V2X is an important project of 5G NR. Compared with Long Term Evolution (LTE) V2X, NR V2X needs to support many new scenarios and new services, and needs to meet higher technical indicators.

NR V2X defines several physical channels, including a physical sidelink control channel (PSCCH), a physical sidelink shared channel (PSSCH), and a physical sidelink feedback channel (PSFCH), which are respectively used to carry sidelink control information (SCI), sidelink data and sidelink feedback information (such as HARQ-ACK).

NR V2X defines two operational modes. For NR V2X mode 1, a time-frequency resource used by a terminal equipment for V2X communication is scheduled and allocated by a network device (e.g. a base station) via an NR Uu link. And for NR V2X mode 2, a terminal equipment may autonomously select time-frequency resources for V2X communication based on sensing results.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

A PSCCH carries 1st stage SCI (first SCI), the 1st stage SCI being mainly used for reserving resources. A PSSCH carries 2nd stage SCI (second SCI) and a transport block (TB), the 2nd stage SCI being mainly used for TB demodulation, and the TB being carried by a media access control (MAC) protocol data unit (PDU). A PSFCH carries sidelink feedback information (HARQ-ACK). And resources used for sidelink transmission are located in a resource pool.

It was found by the inventors that a terminal equipment working in mode 2 may sense potential interference around it, so as to avoid selecting a resource subject to strong interference for transmission. However, due to the different geographical locations of a transmitting device and a receiving device, interference environments around them are also different. Due to limitations of signal propagation distances, the transmitting device is unable to sense all interference to which the receiving device is subject, hence, the resources selected by the transmitting device may possibly not avoid the interference to which the receiving device is subject.

Addressed to at least one of the above problems, embodiments of this disclosure provide sidelink transmission and reception methods and apparatuses.

According to an aspect of the embodiments of this disclosure, there is provided a sidelink transmission method, including:
 transmitting first sidelink control information via a physical sidelink control channel; and
 transmitting second sidelink control information and a first transport block via a physical sidelink shared channel, wherein the first sidelink control information or the second sidelink control information or a media access control protocol data unit of the first transport block indicates or carries triggering information used for triggering a second terminal equipment to report sidelink resource information.

According to another aspect of the embodiments of this disclosure, there is provided a sidelink transmission apparatus, including:
 a first transmitting unit configured to transmit first sidelink control information via a physical sidelink control channel; and
 a second transmitting unit configured to transmit second sidelink control information and a first transport block via a physical sidelink shared channel, wherein the first sidelink control information or the second sidelink control information or a media access control protocol data unit of the first transport block indicates or carries triggering information used for triggering a second terminal equipment to report sidelink resource information.

According to a further aspect of the embodiments of this disclosure, there is provided a sidelink reception method, including:
 receiving first sidelink control information transmitted via a physical sidelink control channel; and
 receiving second sidelink control information and a first transport block transmitted via a physical sidelink shared channel, wherein the first sidelink control information or the second sidelink control information or a media access control protocol data unit of the first transport block indicates or carries triggering information used for triggering a second terminal equipment to report sidelink resource information.

According to still another aspect of the embodiments of this disclosure, there is provided a sidelink reception apparatus, including:
 a first receiving unit configured to receive first sidelink control information transmitted via a physical sidelink control channel; and
 a second receiving unit configured to receive second sidelink control information and a first transport block transmitted via a physical sidelink shared channel, wherein the first sidelink control information or the second sidelink control information or a media access control protocol data unit of the first transport block indicates or carries triggering information used for triggering a second terminal equipment to report sidelink resource information.

According to yet another aspect of the embodiments of this disclosure, there is provided a communication system, including:
 a first terminal equipment configured to transmit first sidelink control information via a physical sidelink control channel, and transmit second sidelink control information and a first transport block via a physical sidelink shared channel, wherein the first sidelink control information or the second sidelink control information or a media access control protocol data unit of the first transport block indicates or carries triggering information; and a second terminal equipment configured to receive the first sidelink control information, the second sidelink control information and the first transport block, wherein the triggering information is used for triggering the second terminal equipment to report sidelink resource information.

An advantage of the embodiments of this disclosure exists in that triggering information is indicated or carried by the first SCI or the second SCI or the MAC PDU of the first transport block, the triggering information being used to trigger the terminal equipment to report the sidelink resource information. By the transmitting device triggering the receiving device to report, the receiving device may report the sidelink resource information (also referred to as coordination information in this text) to the transmitting device, the information more accurately reflecting the interference to which the receiving device is subject, and enabling the transmitting device to avoid interference more efficiently in selecting resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
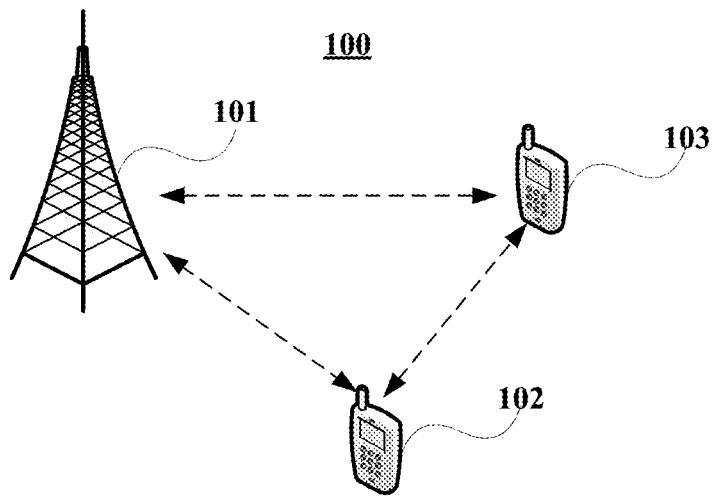
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. "Device" may refer to a network device, or may refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiments of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipments 102 and/or 103 may be allocated with sidelink resources by the network device (that is, in mode 1), or may autonomously select sidelink resources (i.e. in mode 2). Of course, autonomous selection of sidelink resources (i.e. in mode 2) and allocation of sidelink resources by the network device (i.e. in mode 1) may also combined in the embodiments of this disclosure; however, the embodiments of this disclosure is not limited thereto.

In the embodiments of this disclosure, the sidelink is described by taking V2X as an example; however, this disclosure is not limited thereto, and it may also be applicable to sidelink transmission scenarios other than V2X. In the following description, without causing confusion, terms "sidelink" and "V2X" are interchangeable, terms "PSFCH" and "sidelink feedback channel" are interchangeable, terms "PSCCH" and "sidelink control channel" or "sidelink control information" are interchangeable, and terms "PSSCH" and "sidelink data channel" or "sidelink data" are interchangeable.

In addition, transmitting or receiving a PSSCH may be understood as transmitting or receiving sidelink data carried by the PSSCH, and transmitting or receiving a PSFCH may be understood as transmitting or receiving sidelink feedback information carried by the PSFCH. At least one time of transmission may be understood as at least one time of PSSCH/PSCCH transmission or at least one time of sidelink data/information transmission, and current transmission may be understood as current PSSCH/PSCCH transmission or current sidelink data/information transmission.

Embodiments of a First Aspect

The embodiments of this disclosure provide a sidelink transmission method, which shall be described from a terminal equipment. The terminal equipment (which may also be referred to as a transmitting terminal equipment or a first terminal equipment) may be taken as a transmitter of service data to transmit sidelink data to one or more other terminal equipments (which may also be referred to as receiving terminal equipments or second terminal equipments).

Figure 2:
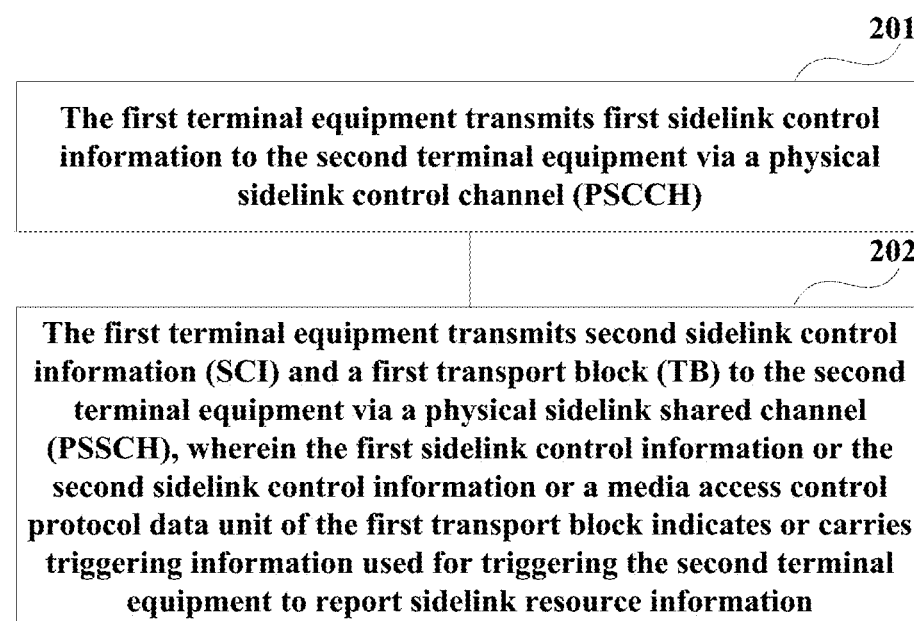
FIG. 2 is a schematic diagram of the sidelink transmission method of an embodiment of this disclosure.

FIG. 2 is a schematic diagram of the sidelink transmission method of the embodiment of this disclosure. As shown in FIG. 2, the method includes:

201: the first terminal equipment transmits first sidelink control information to the second terminal equipment via a physical sidelink control channel (PSCCH); and

202: the first terminal equipment transmits second sidelink control information (SCI) and a first transport block (TB) to the second terminal equipment via a physical sidelink shared channel (PSSCH), wherein the first sidelink control information or the second sidelink control information or a media access control protocol data unit of the first transport block indicates or carries triggering information used for triggering the second terminal equipment to report sidelink resource information.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In some embodiments, the sidelink resource information (also referred to as coordination information in this text) includes a sidelink resource set preferred to be used by the second terminal equipment and/or a sidelink resource set not preferred to be used by the second terminal equipment.

For example, it is assumed that UE B is a transmitting equipment (first terminal equipment), UE A is a receiving equipment (second terminal equipment), and UE B autonomously selects resources for transmission. After UE B triggers UE A to report, UE A transmits coordination information to UE B, the coordination information including a resource set that UE A prefers to use, or a resource set that UE A does not prefer to use, etc., which is not limited in the embodiments of this disclosure. UE B uses the coordination information to perform resource selection and transmission, and how UE B uses the coordination information to select (or reselect) resources is not limited in the embodiments of this disclosure.

For another example, UE A transmits a resource set $S_A$ that UE A prefers to use to UE B, and UE B determines based on sensing that a resource set that UE B prefers to use is $S_B$, then UE B may select resources within an intersection of $S_B$ and $S_A$ for transmission when selecting resources. As the intersection belongs to $S_B$, selecting the intersection will not lead to relatively intensive interference to other devices by transmission of UE B; and as the intersection belongs to $S_A$, selecting the intersection will also not lead to relatively intensive interference to other devices by reception of UE A. In summary, performing transmission based on the coordination information may better avoid interference.

In particular implementations, the sidelink resource information may be a sidelink resource set, or may be indication information indicating a sidelink resource set, such as an index, number, etc., of a sidelink resource set, or may be identification information, index information, and the like, of one or more sidelink resources, and the embodiments of this disclosure is not limited thereto.

In some embodiments, in order to reduce impact on standardization, an existing physical channel structure of NR V2X may be reused, and let UE B transmit the triggering information together with the TB to UE A, and UE B trigger UE A to report the coordination information. For example, the triggering information is indicated by a field in the first sidelink control information or the second sidelink control information (SCI).

For example, a field in 2nd stage SCI may be used to indicate whether to trigger the report of the coordination information. After receiving the triggering information, UE A transmits the coordination information to UE B. The coordination information may be carried in an MAC PDU. After receiving the coordination information, UE B uses the coordination information to transmit one or more TBs, and UE B may transmit a TB that has been transmitted together with the triggering information in previous, or may transmit a new TB.

In some embodiments, the first terminal equipment receives the sidelink resource information reported by the second terminal equipment, and the first terminal equipment transmits the first transport block again according to the sidelink resource information.

Figure 3:
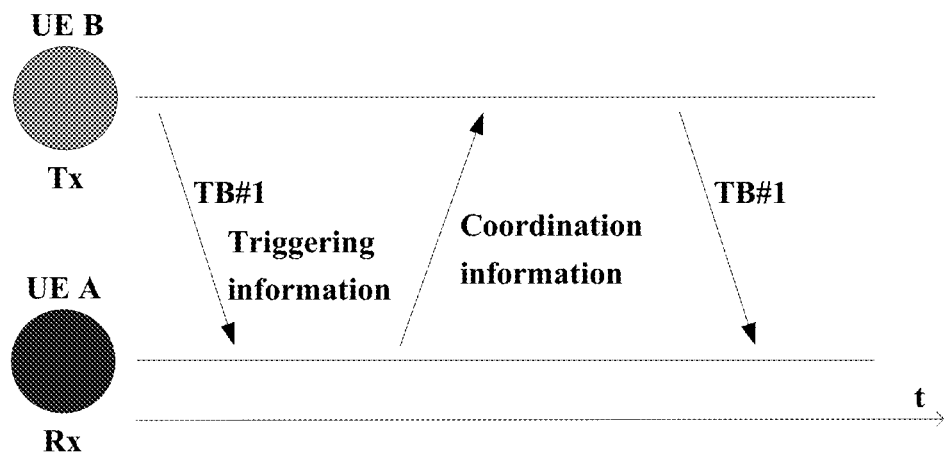
FIG. 3 is an exemplary diagram of sidelink transmission of the embodiment of this disclosure.

FIG. 3 is an exemplary diagram of sidelink transmission of the embodiment of this disclosure. For convenience of description, the TB transmitted together with the triggering information is denoted by TB #1. As shown in FIG. 3, after UE B receives the coordination information, a first TB transmitted based on the coordination information is TB #1.

For example, UE B needs to transmit TB #1 of an aperiodic service to UE A, UE B triggers UE A to report the coordination information, and then transmits TB #1 to UE A based on the coordination information. For another example, UE B needs to transmit a periodic service to UE A, UE B triggers UE A to report the coordination information in a process of transmitting TB #1 of a certain period, then transmits TB #1 of the period based on the coordination information, and may continue to transmit TB #2 of a next period based on the coordination information.

In some embodiments, the first terminal equipment receives the sidelink resource information reported by the second terminal equipment, and the first terminal equipment transmits a second transport block different from the first transport block according to the sidelink resource information.

Figure 4:
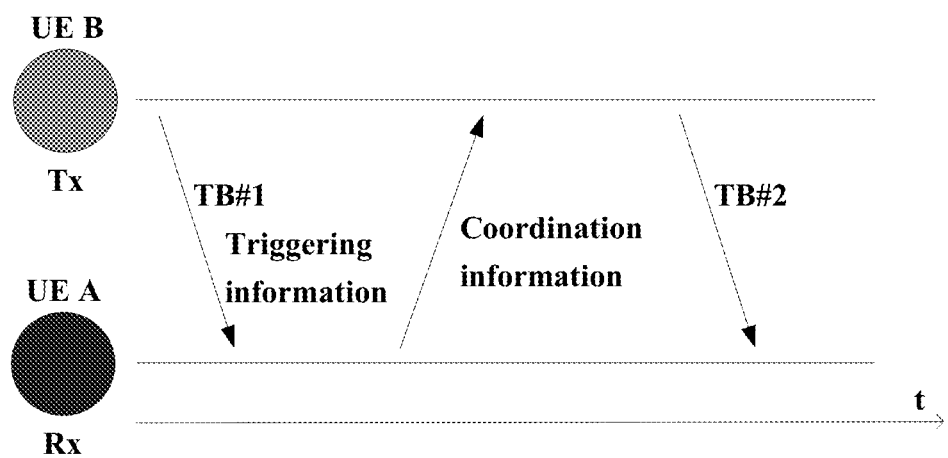
FIG. 4 is another exemplary diagram of the sidelink transmission of the embodiment of this disclosure.

FIG. 4 is another exemplary diagram of the sidelink transmission of the embodiment of this disclosure. As shown in FIG. 4, after UE B receives the coordination information, a first TB transmitted based on the coordination information is TB #2. For example, UE B needs to transmit a periodic service to UE A, UE B triggers UE A to report coordination information during a process of transmitting TB #1 of a previous period, and then transmits TB #2 of a next period to UE A based on the coordination information.

In some embodiments, the second terminal equipment triggers a scheduling request (SR), requesting the network device for sidelink resources for reporting the sidelink resource information.

For example, UE A operates in mode 1, and after UE A learns that it needs to transmit the coordination information, it triggers a scheduling request, requesting a base station to allocate resources for transmitting coordination information.

In some embodiments, the second terminal equipment triggers resource selection or reselection, and autonomously selects and determines sidelink resources for reporting the sidelink resource information.

For example, UE A operates in mode 2, and after UE A learns that it needs to transmit the coordination information, it triggers resource selection or reselection, and autonomously selects resources for transmitting the coordination information.

In some embodiments, the first terminal equipment uses the first sidelink control information (SCI) to reserve sidelink resources used by the second terminal equipment for reporting the sidelink resource information.

For example, transmission of a TB by the UE B needs to satisfy requirements for latency and reliability of a service. If the TB is transmitted based on the coordination information, acquisition of the coordination information also needs to be timely and reliable. If timeliness and reliability of a resource used by UE A for transmitting the coordination information are uncontrollable, it is inconducive to guarantee the latency and reliability of report of the coordination information. Therefore, UE B may reserve a resource used by UE A for transmitting the coordination information while transmitting the triggering information.

For example, UE B uses the 2nd stage SCI to indicate to trigger the report of the coordination information, and reserves a resource used by UE A in the 1st stage SCI for transmitting the coordination information. With the resource reservation, UE B may control report of the coordination information within required latency, and other devices may avoid the resource reserved by UE B by sensing, thereby avoiding interference to the coordination information, and guarantee latency and reliability of the report of the coordination information.

Figure 5:
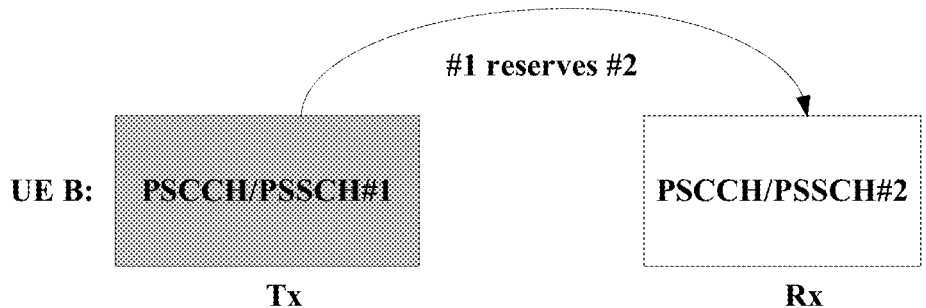
FIG. 5 is a further exemplary diagram of sidelink transmission of the embodiment of this disclosure.

FIG. 5 is a further exemplary diagram of sidelink transmission of the embodiment of this disclosure, schematically illustrating a case of the sidelink resource reserved for use by the second terminal equipment to report the sidelink resource information. As shown in FIG. 5, UE B triggers report of the coordination information, and at the same time, reserves a resource for reporting the coordination information.

In some embodiments, the first terminal equipment transmits first indication information to the second terminal equipment, the first indication information being used by the second terminal equipment to determine the sidelink resource information. The first indication information includes at least one of the following or a combination thereof: resource selection window information, resource set size information, or resource frequency domain size information; however, the embodiments of this disclosure is not limited thereto.

For example, generation of the coordination information needs to be based on relevant information provided by UE B. Assuming that the coordination information of UE A includes the resource set it prefers to use, UE A will determine the resource set based on a sensing result, and UE A may follow an existing process of determining a candidate resource set of mode 2, but it needs to be based on necessary information, and such information may be notified by UE B to UE A.

In some embodiments, the resource selection window information includes at least one of the following: a position of a starting time of the resource selection window, a position of an ending time of the resource selection window, or a packet delay budget (PDB); however, the embodiments of this disclosure are not limited thereto.

For example, the resource selection window information determines in which time range [n+T1, n+T2] that UE A determines the resource set, which may ensure that the resource reported by UE A satisfies a service delay requirement; where, n denotes a slot triggering the report, and T1 and T2 may be determined by using related techniques of mode 2. UE B may notify T1 and T2 to UE A, or UE B may notify T2 to UE A, or UE B may notify the PDB to UE A.

In some embodiments, the resource set size information includes at least one of the following: the number of resources contained in the sidelink resource set, or a ratio of the number of resources contained in the sidelink resource set to a total number of resources in a resource pool; however, the embodiments of this disclosure is not limited thereto.

For example, the resource set size information is used to determine overhead of the report, i.e. the number of resources contained in the resource set. For example, UE B may notify UE A of a percentage of the number of resources accounting for a total number resources in the resource set.

In some embodiments, the resource frequency domain size information includes the number of sub-channels in a frequency domain occupied by sidelink resources, the number of sub-channels being contained in the indication information, or being determined by the number of sub-channels of a transport block transmitted together with the triggering information; however, the embodiments of this disclosure is not limited thereto.

For example, the resource frequency domain size information determines the number of sub-channels occupied by the resources in the resource set in the frequency domain. UE B may notify UE A of this information in an explicit manner; or, UE A may obtain this information in an implicit manner, for example, it determines the frequency domain size of the resource in the resource set according to a frequency domain size of TB #1 transmitted together with the triggering information.

In some embodiments, the first indication information is indicated or carried by the first sidelink control information (SCI), or is indicated or carried by the second sidelink control information (SCI), or is indicated or carried by the media access control (MAC) protocol data unit (PDU) of the first transport block.

In some embodiments, the first transport block only carries information used for indicating the first information.

For example, TB #1 is only used to indicate the first indication information, in other words, TB #1 is unable to be used to transmit valid data information. As no valid data information is transmitted, the receiving equipment reporting the sidelink resource information may or may not feed back ACK/NACK for TB #1.

Figure 6:
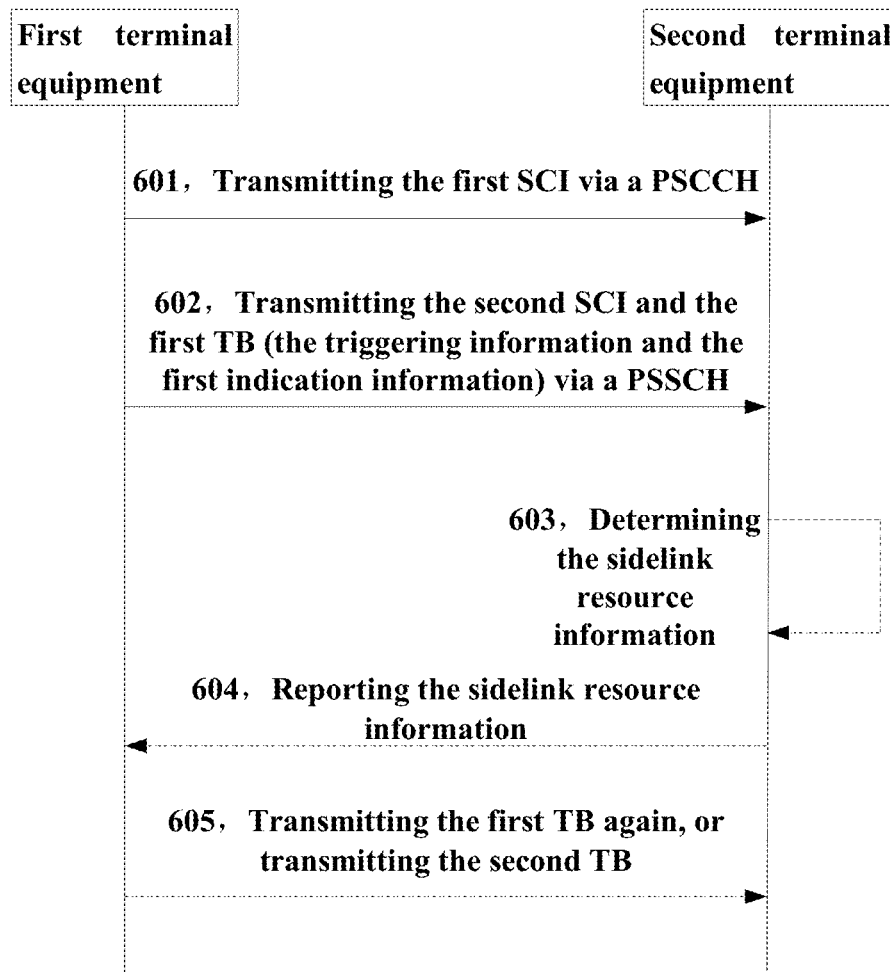
FIG. 6 is a schematic diagram of the sidelink transmission and reception method of an embodiment of this disclosure.

FIG. 6 is a schematic diagram of the sidelink transmission and reception method of an embodiment of this disclosure, schematically showing cases of the triggering information, indication information and sidelink resource information. As shown in FIG. 6, the method includes:

601: the first terminal equipment transmits the first sidelink control information (SCI) to the second terminal equipment via a physical sidelink control channel (PSCCH);

602: the first terminal equipment transmits the second sidelink control information (SCI) and the first transport block (TB) to the second terminal equipment via a physical sidelink shared channel (PSSCH);

wherein, for example, the second sidelink control information or the media access control (MAC) protocol data unit (PDU) of the first transport block indicates or carries the triggering information and the first indication information;

603: the second terminal equipment determines sidelink resource information according to the triggering information and the indication information;

for example, the second terminal equipment may perform resource selection or resource reselection by using an existing sidelink resource selection method of mode 2 according to the first indication information, obtain a sidelink resource set, and obtain the sidelink resource information according to the sidelink resource set;

604: the first terminal equipment receives the sidelink resource information reported by the second terminal equipment; and 605: the first terminal equipment transmits the first transport block again, or transmits a second transport block that is different from the first transport block according to the sidelink resource information.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

The triggering information, the indication information and the sidelink resource information, etc., are schematically described above, and the feedback information of the transport block shall be schematically described below.

In some embodiments, UE B also transmits TB #1 when transmitting the triggering information, and TB #1 transmitted together with the triggering information may be initial transmission of TB #1 or retransmission of TB #1, no matter in which case, TB #1 transmitted together with the triggering information may just enable UE A to successfully demodulate and decode TB #1, but UE B is unable to learn that TB #1 has been successfully received by UE A, and UE B may possibly continue to transmit TB #1 after receiving the coordination information, and such unnecessary transmission will cause waste of resources and interference to other devices.

In some embodiments, the first terminal equipment receives feedback information transmitted by the second terminal equipment indicating whether the first transport block is correctly received.

For example, after receiving the triggering information and TB #1, UE A transmits ACK/NACK for TB #1 to UE B. In this way, if UE B receives the ACK, it may learn that TB #1 has been correctly received, and therefore, it may no longer transmit TB #1, thereby avoiding waste of resources and interference. Although UE B does not transmit TB #1, it may transmit TB #2, that is, transmitting a TB different from TB #1.

In some embodiments, the feedback information is transmitted together with the sidelink resource information. The feedback information is indicated or carried by the first sidelink control information or the second sidelink control information transmitted by the second terminal equipment or the media access control (MAC) protocol data unit (PDU) of the second transport block.

For example, UE A also transmits ACK/NACK for TB #1 when transmitting the coordination information, that is, the ACK/NACK is transmitted together with the coordination information. The ACK/NACK may be indicated by a field of the 2nd stage SCI, or the ACK/NACK may be carried in the MAC PDU. And the coordination information may be carried in the MAC PDU.

Transmitting the ACK/NACK together with the coordination information may be taken as a PSFCH-independent scheme. Although the PSFCH may be used to transmit sidelink ACK/NACK, a resource pool may possibly be not configured with a PSFCH, or even if the resource pool is configured with a PSFCH, a device may possibly be not enabled to feed back ACK/NACK via the PSFCH. Therefore, transmitting the ACK/NACK together with the coordination information is a PSFCH-independent scheme.

In some embodiments, the feedback information is transmitted via a physical sidelink feedback channel (PSFCH), and the sidelink resource information is transmitted via a physical sidelink shared channel (PSSCH). The first terminal equipment transmits the triggering information and the first transport block on a sidelink resource associated with the physical sidelink feedback channel (PSFCH).

For example, UE B transmits the triggering information and TB #1 on the resource associated with the PSFCH, and UE A transmits the ACK/NACK for TB #1 via the PSFCH. UE B may autonomously select a resource for transmitting the triggering information and TB #1, hence, UE B may select a resource associated with the PSFCH and having an appropriate resource position, so that UE A may transmit the ACK/NACK on the PSFCH to UE B.

Figure 7:
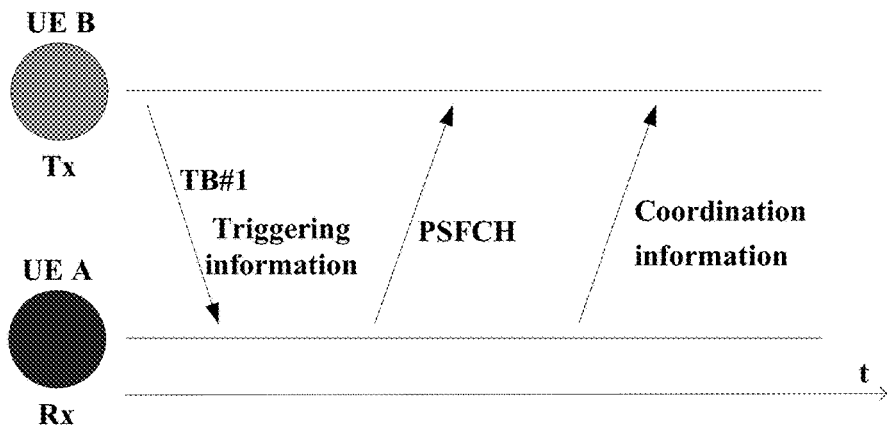
FIG. 7 is still another exemplary diagram of the sidelink transmission of the embodiment of this disclosure.

FIG. 7 is still another exemplary diagram of the sidelink transmission of the embodiment of this disclosure, showing a situation where the PSFCH is located between TB #1 and the coordination information in the time domain. The PSFCH may also be located after the coordination information, or may be located in the same slot as the coordination information.

On the premise that UE A transmits the ACK/NACK on the PSFCH, UE A may or may not transmit the ACK/NACK when transmitting the coordination information. And after receiving the ACK/NACK and the coordination information, UE B may decide to use the coordination information to transmit TB #1 or TB #2.

This implementation of transmitting the ACK/NACK by UE A via the PSFCH may only be used for a resource pool configured with a PSFCH. And for a resource pool configured without PSFCH, the above implementation of transmitting the ACK/NACK together with the coordination information may be used. For the resource pool configured with a PSFCH, UE A may possibly not be enabled to feed back the ACK/NACK via the PSFCH. No matter whether UE A is enabled to feed back the ACK/NACK via the PSFCH, after UE A receives the triggering information and TB #1 from UE B, UE A needs to transmit the ACK/NACK via the PSFCH.

Figure 8:
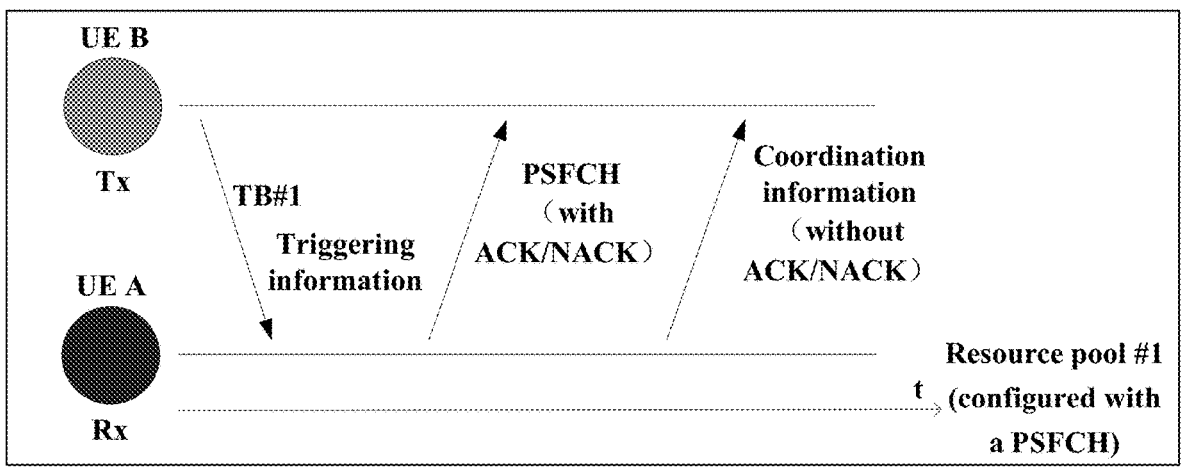
FIG. 8 is yet another exemplary diagram of the sidelink transmission of the embodiment of this disclosure.
Figure 8:
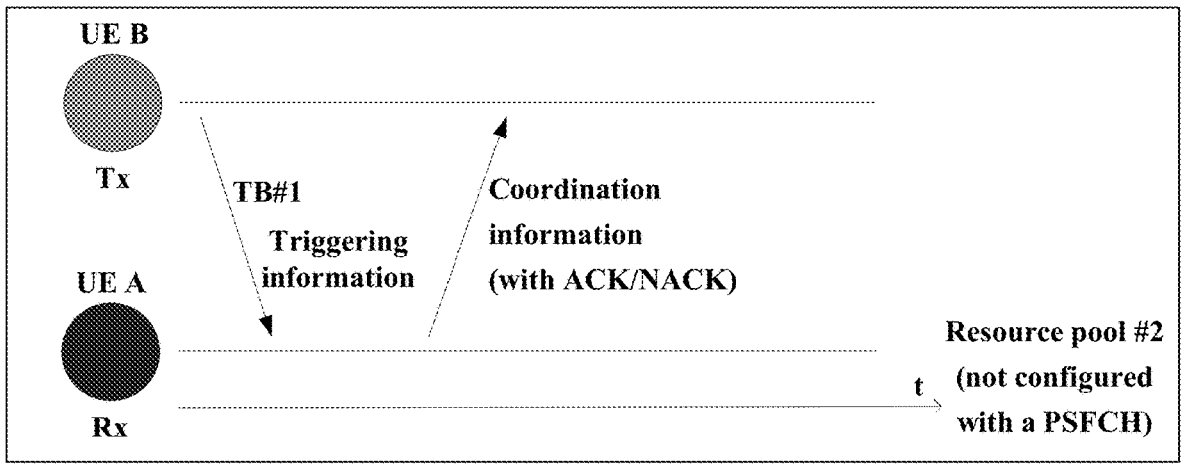

FIG. 8 is yet another exemplary diagram of the sidelink transmission of the embodiment of this disclosure, schematically illustrating by taking two resource pools as examples. As shown in the upper part of FIG. 8, resource pool #1 configured with a PSFCH only uses the PSFCH to report the ACK/NACK; and as shown in the lower part of FIG. 8, resource pool #2 not configured with PSFCH reports the ACK/NACK together with the coordination information.

In some embodiments, the second terminal equipment does not transmit the sidelink resource information if the first transport block is correctly received.

For example, UE A may only transmit the ACK on the PSFCH, and does not transmit the coordination information. For example, when the PSFCH is not located after the coordination information, as UE B may possibly no longer need the coordination information after receiving the ACK via the PSFCH (for example, UE B originally intends to use the coordination information to transmit TB #1, but it receives the ACK for TB #1 before receiving the coordination information), UE A may not transmit the coordination information, thereby reducing interference to other devices.

In some embodiments, the first sidelink control information or the second sidelink control information or the media access control (MAC) protocol data unit (PDU) of the first transport block indicates or carries the second indication information, the second indication information indicates whether the second terminal equipment reports the sidelink resource information when the first transport block is correctly received.

For example, UE B may indicate whether UE A reports the coordination information under an ACK condition via a field in the 1st stage SCI or 2nd stage SCI. For example, if a purpose of triggering the report of the coordination information by UE B is to transmit aperiodic service TB #1, UE B may instruct UE A not to report the coordination information when TB #1 is ACK; and if the purpose of triggering the report of the coordination information by UE B is to transmit a periodic service, as UE B may use the coordination information to transmit TB #2, UE B may instruct UE A to still report the coordination information when TB #1 is ACK. UE B may transmit an indication of whether to report the coordination information together with the triggering information to UE A.

The above field indicating whether UE A reports the coordination information under the ACK condition may be a newly defined field; for example, a 1-bit field indicates two states of "Yes" and "No". And existing fields may also be reused; for example, a value of a period field in the 1st stage SCI being 0 indicates that the coordination information needs not to be reported; otherwise, it indicates that coordination information needs to be reported.

When UE A operates in mode 2, not reporting the coordination information means that resource selection or resource reselection will not be triggered; and when UE A operates in mode 1, not reporting the coordination information means that a scheduling request (SR) will not be triggered.

In some embodiments, the sidelink resource information is used by the first terminal equipment to transmit a second transport block different from the first transport block.

For example, UE B may be restricted to use the coordination information only for new TB transmission after receiving the coordination information, that is, the coordination information is not used for transmission of TB #1. Hence, UE B will not repeatedly transmit correctly received TB #1, thereby avoiding waste of resource and interference.

For example, UE B with periodic services may perform multiple times of transmission of TB #1 by autonomously selecting resources, and when TB #1 is transmitted for the last time, trigger UE A to report the coordination information. After receiving the coordination information, UE B uses the coordination information for transmitting TB #2 of a next period.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the triggering information is indicated or carried by the first SCI or the second SCI or the MAC PDU of the first transport block, the triggering information being used to trigger the terminal equipment to report the sidelink resource information. By the transmitting device triggering the receiving device to report, the receiving device may report the sidelink resource information (also referred to as coordination information in this text) to the transmitting device, the information more accurately reflecting the interference to which the receiving device is subject, and enabling the transmitting device to avoid interference more efficiently in selecting resources.

Embodiments of a Second Aspect

The embodiments of this disclosure provide a sidelink transmission method, which shall be described from a terminal equipment. The terminal equipment (which may also be referred to as a receiving terminal equipment or a second terminal equipment) may be taken as a receiver of service data to receive sidelink data transmitted by one or more other terminal equipments (which may also be referred to as transmitting terminal equipments or first terminal equipments). Contents in this embodiment identical to those in the embodiment of the first aspect shall not be described herein any further.

Figure 9:
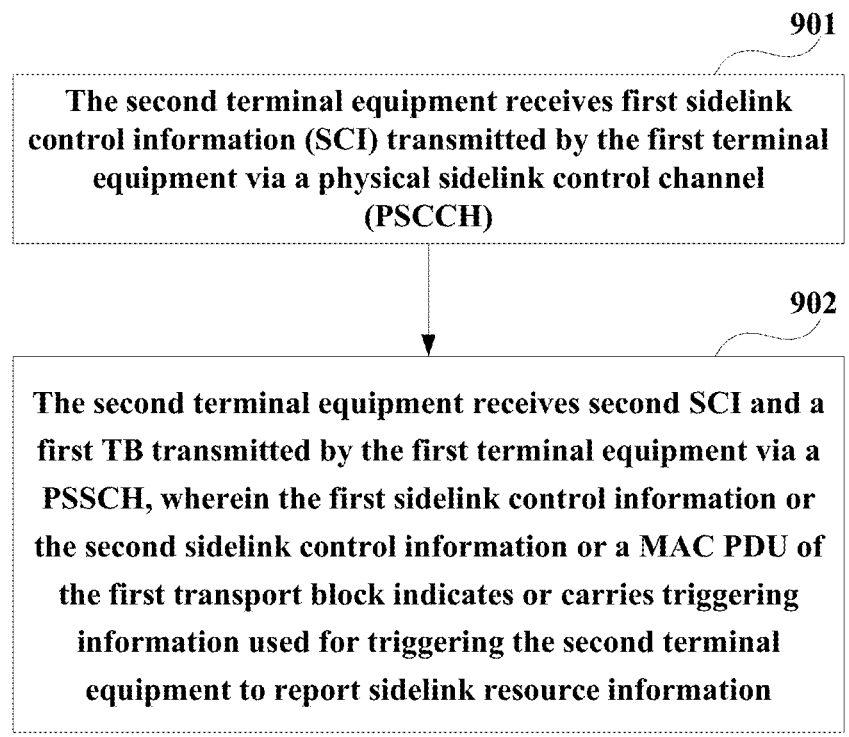
FIG. 9 is a schematic diagram of the sidelink reception method of an embodiment of this disclosure.

FIG. 9 is a schematic diagram of the sidelink reception method of the embodiment of this disclosure. As shown in FIG. 9, the method includes:

901: the second terminal equipment receives first sidelink control information (SCI) transmitted by the first terminal equipment via a physical sidelink control channel (PSCCH); and 902: the second terminal equipment receives second sidelink control information (SCI) and a first transport block (TB) transmitted by the first terminal equipment via a physical sidelink shared channel (PSSCH), wherein the first sidelink control information or the second sidelink control information or a media access control (MAC) protocol data unit (PDU) of the first transport block indicates or carries triggering information used for triggering the second terminal equipment to report sidelink resource information.

In some embodiments, the sidelink resource information includes a sidelink resource set preferred to be used by the second terminal equipment and/or a sidelink resource set not preferred to be used by the second terminal equipment.

In some embodiments, the triggering information is indicated by a field in the first sidelink control information or the second sidelink control information (SCI).

In some embodiments, the first sidelink control information (SCI) reserves a sidelink resource used by the second terminal equipment to report sidelink resource information.

In some embodiments, the method further includes: the second terminal equipment receives first indication information transmitted by the first terminal equipment and used by the second terminal equipment for determining sidelink resource information.

In some embodiments, the first indication information includes at least one of the following or a combination thereof: resource selection window information, resource set size information, or resource frequency domain size information.

In some embodiments, the resource selection window information includes at least one of the following: a position of a starting time of the resource selection window, a position of an ending time of the resource selection window, or a packet delay budget (PDB).

In some embodiments, the resource set size information includes at least one of the following: the number of resources contained in the sidelink resource set, or a ratio of the number of resources contained in the sidelink resource set to a total number of resources in a resource pool.

In some embodiments, the resource frequency domain size information includes the number of sub-channels in a frequency domain occupied by sidelink resources, the number of sub-channels being contained in the indication information, or being determined by a frequency domain size (the number of sub-channels) of resource of a transport block transmitted together with the triggering information.

In some embodiments, the first indication information is indicated or carried by the first sidelink control information (SCI), or is indicated or carried by the second sidelink control information (SCI), or is indicated or carried by the media access control (MAC) protocol data unit (PDU) of the first transport block.

In some embodiments, the first transport block only carries information used for indicating the first information.

In some embodiments, the method further includes: the second terminal equipment reports the sidelink resource information to the first terminal equipment; and receives the first transport block transmitted again by the first terminal equipment according to the sidelink resource information, or receives a second transport block different from the first transport block transmitted by the first terminal equipment according to the sidelink resource information.

In some embodiments, the method further includes: the second terminal equipment transmits feedback information to the first terminal equipment, the feedback information being used for indicating whether the first transport block is correctly received.

In some embodiments, the feedback information is transmitted together with the sidelink resource information.

In some embodiments, the feedback information is indicated or carried by the first sidelink control information or the second sidelink control information or the media access control (MAC) protocol data unit (PDU) of the second transport block transmitted by the second terminal equipment.

In some embodiments, the feedback information is transmitted via a physical sidelink feedback channel (PSFCH), and the sidelink resource information is transmitted via a physical sidelink shared channel (PSSCH).

In some embodiments, the first terminal equipment transmits the triggering information and the first transport block on a sidelink resource associated with the physical sidelink feedback channel (PSFCH).

In some embodiments, the second terminal equipment does not transmit the sidelink resource information when the first transport block is correctly received.

In some embodiments, the second indication information is indicated or carried by the first sidelink control information or the second sidelink control information or a media access control (MAC) protocol data unit (PDU) of the first transport block, the second indication information indicating whether the second terminal equipment reports the sidelink resource information when the first transport block is correctly received.

In some embodiments, the sidelink resource information is used by the first terminal equipment to transmit the second transport block different from the first transport block.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the triggering information is indicated or carried by the first SCI or the second SCI or the MAC PDU of the first transport block, the triggering information being used to trigger the terminal equipment to report the sidelink resource information. By the transmitting device triggering the receiving device to report, the receiving device may report the sidelink resource information (also referred to as coordination information in this text) to the transmitting device, the information more accurately reflecting the interference to which the receiving device is subject, and enabling the transmitting device to avoid interference more efficiently in selecting resources.

Embodiments of a Third Aspect

The embodiments of this disclosure provide a sidelink transmission apparatus. The apparatus may be, for example, a terminal equipment, or may be one or more components or assemblies configured in a terminal equipment. Contents in this embodiment identical to those in the embodiment of the first aspect shall not be described herein any further.

Figure 10:
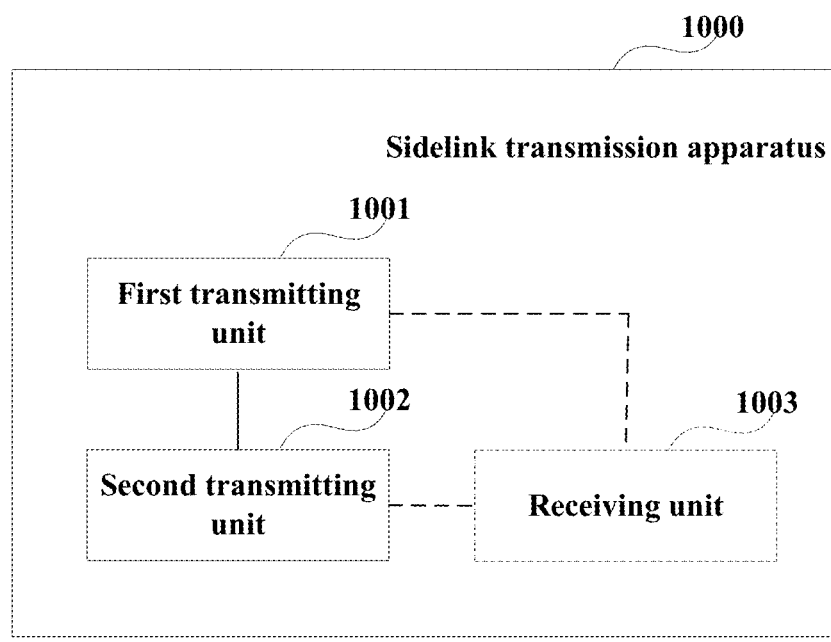
FIG. 10 is a schematic diagram of the sidelink transmission apparatus of an embodiment of this disclosure.

FIG. 10 is a schematic diagram of the sidelink transmission apparatus of the embodiment of this disclosure. As shown in FIG. 10, the sidelink transmission apparatus 1000 includes:

a first transmitting unit 1001 configured to transmit first sidelink control information via a physical sidelink control channel; and a second transmitting unit 1002 configured to transmit second sidelink control information and a first transport block via a physical sidelink shared channel, wherein the first sidelink control information or the second sidelink control information or a media access control protocol data unit of the first transport block indicates or carries triggering information used for triggering a second terminal equipment to report sidelink resource information.

In some embodiments, the sidelink resource information includes a sidelink resource set preferred to be used by the second terminal equipment and/or a sidelink resource set not preferred to be used by the second terminal equipment.

In some embodiments, the triggering information is indicated by a field in the first sidelink control information or the second sidelink control information.

In some embodiments, the first sidelink control information reserves one or more sidelink resources used by the second terminal equipment for reporting the sidelink resource information.

In some embodiments, the second transmitting unit 1002 is further configured to transmit first indication information used by the second terminal equipment for determining the sidelink resource information.

In some embodiments, the first indication information includes at least one piece of the following or a combination thereof: resource selection window information, resource set size information, or resource frequency domain size information.

In some embodiments, the resource selection window information includes at least one of the following: a position of a starting time of the resource selection window, a position of an ending time of the resource selection window, or a packet delay budget;

the resource set size information includes at least one of the following: the number of resources contained in the sidelink resource set, or a ratio of the number of resources contained in the sidelink resource set to a total number of resources in a resource pool;

and the resource frequency domain size information includes the number of sub-channels in a frequency domain occupied by sidelink resources; the number of sub-channels being contained in the indication information, or being determined by the number of sub-channels of a transport block transmitted together with the triggering information.

In some embodiments, the first indication information is indicated or carried by the first sidelink control information, or is indicated or carried by the second sidelink control information, or is indicated or carried by the media access control protocol data unit of the first transport block.

In some embodiments, the first transport block only carries information used for indicating the first information.

In some embodiments, as shown in FIG. 10, the sidelink transmission apparatus 1000 may further include:
a receiving unit 1003 configured to receive the sidelink resource information reported by the second terminal equipment;
and the second transmitting unit 1002 transmits the first transport block again according to the sidelink resource information, or transmits a second transport block different from the first transport block.

In some embodiments, the receiving unit 1003 is further configured to receive feedback information transmitted by the second terminal equipment, the feedback information indicating whether the first transport block is correctly received.

In some embodiments, the feedback information and the sidelink resource information are transmitted together.

In some embodiments, the feedback information is indicated or carried by first sidelink control information or second sidelink control information or a media access control protocol data unit of a second transport block transmitted by the second terminal equipment.

In some embodiments, the feedback information is transmitted via a physical sidelink feedback channel, and the sidelink resource information is transmitted via a physical sidelink shared channel.

In some embodiments, the second transmitting unit 1002 transmits the triggering information and the first transport block on a sidelink resource associated with a physical sidelink feedback channel.

In some embodiments, the second terminal equipment does not transmit the sidelink resource information when the first transport block is correctly received.

In some embodiments, the first sidelink control information or the second sidelink control information or the media access control protocol data unit of the first transport block indicates or carries second indication information, the second indication information indicating whether the second terminal equipment reports the sidelink resource information when the first transport block is correctly received.

In some embodiments, the sidelink resource information is used to transmit a second transport block different from the first transport block.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the sidelink transmission apparatus 1000 may further include other components or modules, and reference may be made to related techniques for particulars of these components or modules.

Furthermore, for the sake of simplicity, connection relationships between the components or modules or signal profiles thereof are only illustrated in FIG. 10. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that the triggering information is indicated or carried by the first SCI or the second SCI or the MAC PDU of the first transport block, the triggering information being used to trigger the terminal equipment to report the sidelink resource information. By the transmitting device triggering the receiving device to report, the receiving device may report the sidelink resource information (also referred to as coordination information in this text) to the transmitting device, the information more accurately reflecting the interference to which the receiving device is subject, and enabling the transmitting device to avoid interference more efficiently in selecting resources.

Embodiments of a Fourth Aspect

The embodiments of this disclosure provide a sidelink reception apparatus. The apparatus may be, for example, a terminal equipment, or may be one or more components or assemblies configured in a terminal equipment. Contents in this embodiment identical to those in the embodiment of the second aspect shall not be described herein any further.

Figure 11:
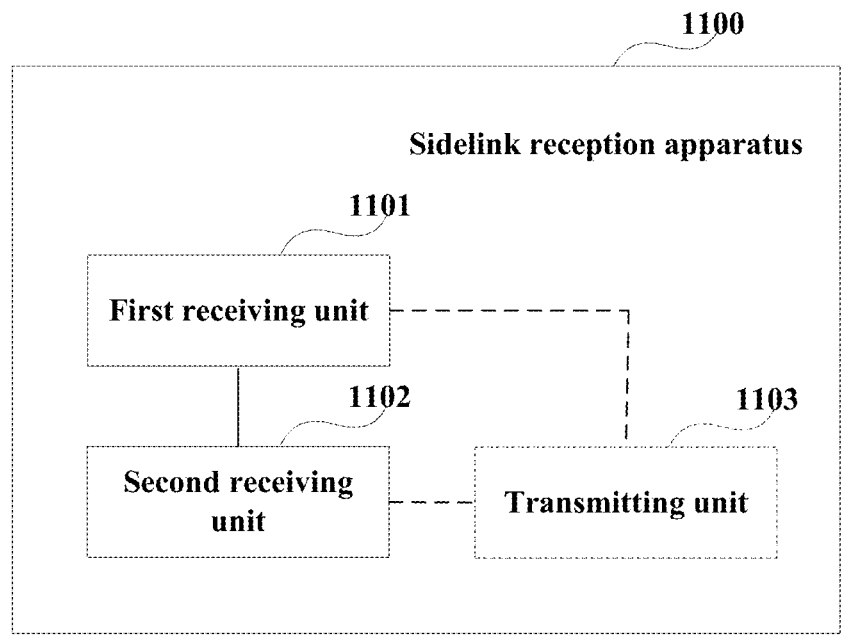
FIG. 11 is a schematic diagram of the sidelink reception apparatus of an embodiment of this disclosure.

FIG. 11 is a schematic diagram of the sidelink reception apparatus of the embodiment of this disclosure. As shown in FIG. 11, the sidelink reception apparatus 1100 includes:
a first receiving unit 1101 configured to receive first sidelink control information transmitted via a physical sidelink control channel; and
a second receiving unit 1102 configured to receive second sidelink control information and a first transport block transmitted via a physical sidelink shared channel, wherein the first sidelink control information or the second sidelink control information or a media access control protocol data unit of the first transport block indicates or carries triggering information used for triggering a second terminal equipment to report sidelink resource information.

In some embodiments, as shown in FIG. 11, the sidelink reception apparatus 1100 may further include:
a transmitting unit 1103 configured to report the sidelink resource information.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the sidelink reception apparatus 1100 may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the triggering information is indicated or carried by the first SCI or the second SCI or the MAC PDU of the first transport block, the triggering information being used to trigger the terminal equipment to report the sidelink resource information. By the transmitting device triggering the receiving device to report, the receiving device may report the sidelink resource information (also referred to as coordination information in this text) to the transmitting device, the information more accurately reflecting the interference to which the receiving device is subject, and enabling the transmitting device to avoid interference more efficiently in selecting resources.

Embodiments of a Fifth Aspect

The embodiments of this disclosure provide a communication system, and reference may be made to FIG. 1, with contents identical to those in the embodiments of the first to the fourth aspects being not going to be described herein any further. The communication system includes:

a first terminal equipment configured to transmit first sidelink control information via a physical sidelink control channel, and transmit second sidelink control information and a first transport block via a physical sidelink shared channel, wherein the first sidelink control information or the second sidelink control information or a media access control protocol data unit of the first transport block indicates or carries triggering information; and a second terminal equipment configured to receive the first sidelink control information, the second sidelink control information and the first transport block, wherein the triggering information is used for triggering the second terminal equipment to report sidelink resource information.

The embodiments of this disclosure further provide a network device, which may be, for example, a base station. However, this disclosure is not limited thereto, and it may also be another network device.

Figure 12:
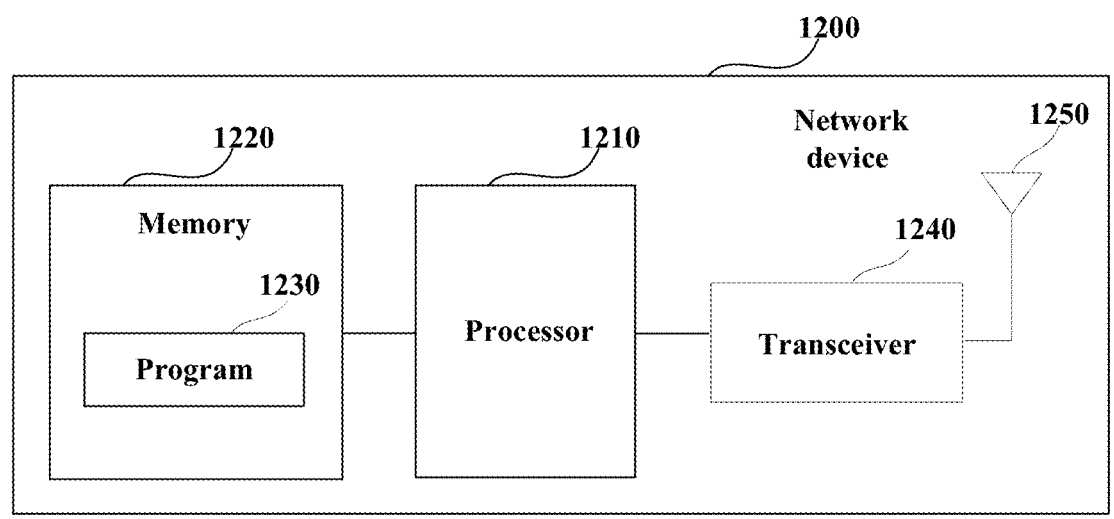
FIG. 12 is a schematic diagram of the network device of an embodiment of this disclosure.

FIG. 12 is a schematic diagram of a structure of the network device of the embodiment of this disclosure. As shown in FIG. 12, the network device 1200 may include a processor 1210 (such as a central processing unit (CPU)) and a memory 1220, the memory 1220 being coupled to the processor 1210. Wherein, the memory 1220 may store various data, and furthermore, it may store a program 1230 for information processing, and execute the program 1230 under control of the processor 1210.

Furthermore, as shown in FIG. 12, the network device 1200 may include a transceiver 1240, and an antenna 1250, etc. Functions of the above components are similar to those in the related art, and shall not be described herein any further. It should be noted that the network device 1200 does not necessarily include all the parts shown in FIG. 12, and furthermore, the network device 1200 may include parts not shown in FIG. 12, and the related art may be referred to.

The embodiments of this disclosure further provide a terminal equipment; however, this disclosure is not limited thereto, and it may also be another equipment.

Figure 13:
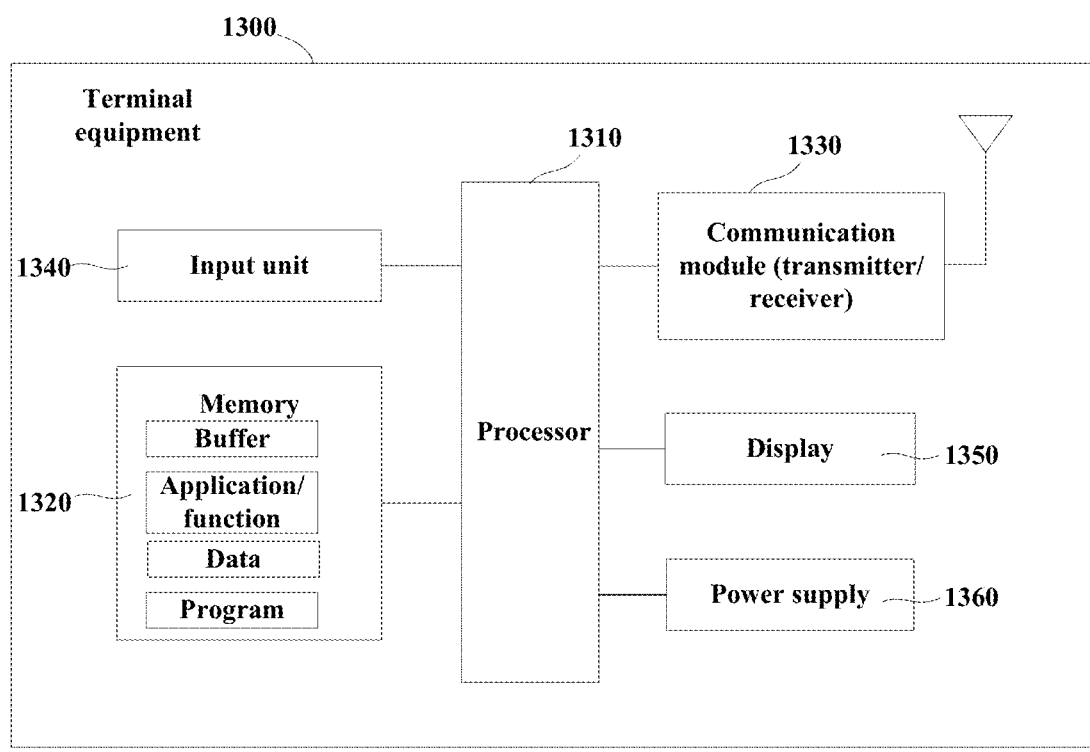
FIG. 13 is a schematic diagram of the terminal equipment of an embodiment of this disclosure.

FIG. 13 is a schematic diagram of the terminal equipment of the embodiment of this disclosure. As shown in FIG. 13, the terminal equipment 1300 may include a processor 1310 and a memory 1320, the memory 1320 storing data and a program and being coupled to the processor 1310. It should be noted that this figure is illustrative only, and other types of structures may also be used, so as to supplement or replace this structure and achieve a telecommunications function or other functions.

For example, the processor 1310 may be configured to execute a program to carry out the sidelink transmission method as described in the embodiments of the first aspect. For example, the processor 1310 may be configured to perform the following control: transmitting first sidelink control information (SCI) via a physical sidelink control channel (PSCCH); and transmitting second sidelink control information (SCI) and a first transport block (TB) via a physical sidelink shared channel (PSSCH), wherein the first sidelink control information or the second sidelink control information or a media access control (MAC) protocol data unit (PDU) of the first transport block indicates or carries triggering information used for triggering a second terminal equipment to report sidelink resource information.

For example, the processor 1310 may be configured to execute a program to carry out the sidelink reception method as described in the embodiments of the second aspect. For example, the processor 1310 may be configured to perform the following control: receiving first sidelink control information transmitted via a physical sidelink control channel; and receiving second sidelink control information and a first transport block transmitted via a physical sidelink shared channel, wherein the first sidelink control information or the second sidelink control information or a media access control protocol data unit of the first transport block indicates or carries triggering information used for triggering a second terminal equipment to report sidelink resource information.

As shown in FIG. 13, the terminal equipment 1300 may further include a communication module 1330, an input unit 1340, a display 1350, and a power supply 1360; wherein functions of the above components are similar to those in the related art, which shall not be described herein any further. It should be noted that the terminal equipment 1300 does not necessarily include all the parts shown in FIG. 13, and the above components are not necessary. Furthermore, the terminal equipment 1300 may include parts not shown in FIG. 13, and the related art may be referred to.

An embodiment of this disclosure provides a computer program, which, when executed in a terminal equipment, will cause the terminal equipment to carry out the sidelink transmission method as described in the embodiment of the first aspect.

An embodiment of this disclosure provides a storage medium, including a computer program, which will cause a terminal equipment to carry out the sidelink transmission method as described in the embodiment of the first aspect.

An embodiment of this disclosure provides a computer program, which, when executed in a terminal equipment, will cause the terminal equipment to carry out the sidelink reception method as described in the embodiment of the second aspect.

An embodiment of this disclosure provides a storage medium, including a computer program, which will cause a terminal equipment to carry out the reception method as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

As to implementations containing the above embodiments, following supplements are further disclosed.

Supplement 1. A sidelink transmission method, including:
transmitting first sidelink control information (SCI) by a first terminal equipment to a second terminal equipment via a physical sidelink control channel (PSCCH); and
transmitting second sidelink control information (SCI) and a first transport block (TB) to the second terminal equipment via a physical sidelink shared channel (PSSCH), wherein the first sidelink control information or the second sidelink control information or a media access control (MAC) protocol data unit (PDU) of the first transport block indicates or carries triggering information used for triggering a second terminal equipment to report sidelink resource information.

Supplement 2. The method according to supplement 1, wherein the sidelink resource information includes a sidelink resource set preferred to be used by the second terminal equipment and/or a sidelink resource set not preferred to be used by the second terminal equipment.

Supplement 3. The method according to supplement 1 or 2, wherein the triggering information is indicated by a field in the first sidelink control information or the second sidelink control information (SCI).

Supplement 4. The method according to any one of supplements 1-3, wherein the method further includes:
reserving, by the first terminal equipment by using the first sidelink control information (SCI), one or more sidelink resources used by the second terminal equipment for reporting the sidelink resource information.

Supplement 5. The method according to any one of supplements 1-4, wherein the method further includes:
transmitting first indication information by the first terminal equipment to the second terminal equipment, the first indication information being used by the second terminal equipment for determining the sidelink resource information.

Supplement 6. The method according to supplement 5, wherein the first indication information includes at least one piece of the following or a combination thereof: resource selection window information, resource set size information, or resource frequency domain size information.

Supplement 7. The method according to supplement 6, wherein the resource selection window information includes at least one of the following: a position of a starting time of the resource selection window, a position of an ending time of the resource selection window, or a packet delay budget (PDB).

Supplement 8. The method according to supplement 6, wherein the resource set size information includes at least one of the following: the number of resources contained in the sidelink resource set, or a ratio of the number of resources contained in the sidelink resource set to a total number of resources in a resource pool.

Supplement 9. The method according to supplement 6, wherein the resource frequency domain size information includes the number of sub-channels in a frequency domain occupied by sidelink resources; the number of sub-channels being contained in the indication information, or being determined by the number of sub-channels of a transport block transmitted together with the triggering information.

Supplement 10. The method according to any one of supplements 5-9, wherein the first indication information is indicated or carried by the first sidelink control information (SCI), or is indicated or carried by the second sidelink control information (SCI), or is indicated or carried by the media access control (MAC) protocol data unit (PDU) of the first transport block.

Supplement 11. The method according to any one of supplements 5-10, wherein the first transport block only carries information used for indicating the first information.

Supplement 12. The method according to any one of supplements 1-11, wherein the method further includes:
receiving, by the first terminal equipment, the sidelink resource information reported by the second terminal equipment; and
transmitting the first transport block again according to the sidelink resource information, or transmitting a second transport block different from the first transport block, by the first terminal equipment.

Supplement 13. The method according to supplement 12, wherein the method further includes:
receiving, by the first terminal equipment, feedback information transmitted by the second terminal equipment, the feedback information indicating whether the first transport block is correctly received.

Supplement 14. The method according to supplement 13, wherein the feedback information and the sidelink resource information are transmitted together.

Supplement 15. The method according to supplement 14, wherein the feedback information is indicated or carried by first sidelink control information or second sidelink control information or a media access control (MAC) protocol data unit (PDU) of a second transport block transmitted by the second terminal equipment.

Supplement 16. The method according to supplement 13, wherein the feedback information is transmitted via a physical sidelink feedback channel (PSFCH), and the sidelink resource information is transmitted via a physical sidelink shared channel (PSSCH).

Supplement 17. The method according to supplement 16, wherein the first terminal equipment transmits the triggering information and the first transport block on a sidelink resource (PSFCH) associated with a physical sidelink feedback channel.

Supplement 18. The method according to any one of supplements 1-11, wherein the second terminal equipment does not transmit the sidelink resource information when the first transport block is correctly received.

Supplement 19. The method according to any one of supplements 1-18, wherein the first sidelink control information or the second sidelink control information or the media access control (MAC) protocol data unit (PDU) of the first transport block indicates or carries second indication information, the second indication information indicating whether the second terminal equipment reports the sidelink resource information when the first transport block is correctly received.

Supplement 20. The method according to any one of supplements 1-19, wherein the sidelink resource information is used by the first terminal equipment to transmit a second transport block different from the first transport block.

Supplement 21. A sidelink reception method, including:
receiving, by a second terminal equipment, first sidelink control information (SCI) transmitted by a first terminal equipment via a physical sidelink control channel (PSCCH); and
receiving, by the second terminal equipment, second sidelink control information (SCI) and a first transport block (TB) transmitted via a physical sidelink shared channel (PSSCH), wherein the first sidelink control information or the second sidelink control information or a media access control (MAC) protocol data unit (PDU) of the first transport block indicates or carries triggering information used for triggering a second terminal equipment to report sidelink resource information.

Supplement 22. The method according to supplement 21, wherein the sidelink resource information includes a sidelink resource set preferred to be used by the second terminal equipment and/or a sidelink resource set not preferred to be used by the second terminal equipment.

Supplement 23. The method according to supplement 21 or 22, wherein the triggering information is indicated by a field in the first sidelink control information or the second sidelink control information (SCI).

Supplement 24. The method according to any one of supplements 21-23, wherein the first sidelink control information (SCI) reserves one or more sidelink resources used by the second terminal equipment for reporting the sidelink resource information.

Supplement 25. The method according to any one of supplements 21-24, wherein the method further includes:
receiving, by the second terminal equipment, first indication information transmitted by the first terminal equipment, the first indication information being used by the second terminal equipment for determining the sidelink resource information.

Supplement 26. The method according to supplement 25, wherein the first indication information includes at least one piece of the following or a combination thereof: resource selection window information, resource set size information, or resource frequency domain size information.

Supplement 27. The method according to supplement 26, wherein the resource selection window information includes at least one of the following: a position of a starting time of the resource selection window, a position of an ending time of the resource selection window, or a packet delay budget (PDB).

Supplement 28. The method according to supplement 26, wherein the resource set size information includes at least one of the following: the number of resources contained in the sidelink resource set, or a ratio of the number of resources contained in the sidelink resource set to a total number of resources in a resource pool.

Supplement 29. The method according to supplement 26, wherein the resource frequency domain size information includes the number of sub-channels in a frequency domain occupied by sidelink resources; the number of sub-channels being contained in the indication information, or being determined by the number of sub-channels of a transport block transmitted together with the triggering information.

Supplement 30. The method according to any one of supplements 25-29, wherein the first indication information is indicated or carried by the first sidelink control information (SCI), or is indicated or carried by the second sidelink control information (SCI), or is indicated or carried by the media access control (MAC) protocol data unit (PDU) of the first transport block.

Supplement 31. The method according to any one of supplements 25-30, wherein the first transport block only carries information used for indicating the first information.

Supplement 32. The method according to any one of supplements 21-31, wherein the method further includes:
triggering a scheduling request (SR) by the second terminal equipment, requesting a network device for sidelink resources used for reporting the sidelink resource information.

Supplement 33. The method according to any one of supplements 21-31, wherein the method further includes:
triggering resource selection or resource reselection by the second terminal equipment, autonomously selecting and determining the sidelink resources used for reporting the sidelink resource information.

Supplement 34. The method according to any one of supplements 21-33, wherein the method further includes:
reporting the sidelink resource information by the second terminal equipment to the first terminal equipment; and
receiving the first transport block transmitted by the first terminal equipment again according to the sidelink resource information, or a second transport block different from the first transport block transmitted by the first terminal equipment according to the sidelink resource information.

Supplement 35. The method according to supplement 34, wherein the method further includes:
transmitting feedback information by the second terminal equipment to the first terminal equipment, the feedback information indicating whether the first transport block is correctly received.

Supplement 36. The method according to supplement 35, wherein the feedback information and the sidelink resource information are transmitted together.

Supplement 37. The method according to supplement 36, wherein the feedback information is indicated or carried by first sidelink control information or second sidelink control information or a media access control (MAC) protocol data unit (PDU) of a second transport block transmitted by the second terminal equipment.

Supplement 38. The method according to supplement 35, wherein the feedback information is transmitted via a physical sidelink feedback channel (PSFCH), and the sidelink resource information is transmitted via a physical sidelink shared channel (PSSCH).

Supplement 39. The method according to supplement 38, wherein the first terminal equipment transmits the triggering information and the first transport block on a sidelink resource (PSFCH) associated with a physical sidelink feedback channel.

Supplement 40. The method according to any one of supplements 21-31, wherein the second terminal equipment does not transmit the sidelink resource information when the first transport block is correctly received.

Supplement 41. The method according to any one of supplements 21-40, wherein the first sidelink control information or the second sidelink control information or the media access control (MAC) protocol data unit (PDU) of the first transport block indicates or carries second indication information, the second indication information indicating whether the second terminal equipment reports the sidelink resource information when the first transport block is correctly received.

Supplement 42. The method according to any one of supplements 21-41, wherein the sidelink resource information is used by the first terminal equipment to transmit a second transport block different from the first transport block.

Supplement 43. A terminal equipment, including a memory and a processor, the memory storing a computer program, and the processor being configured to execute the computer program to carry out the sidelink transmission method as described in any one of supplements 1-20.

Supplement 44. A terminal equipment, including a memory and a processor, the memory storing a computer program, and the processor being configured to execute the computer program to carry out the sidelink reception method as described in any one of supplements 21-42.

Supplement 45. A communication system, including the terminal equipment as described in supplement 43 and the terminal equipment as described in supplement 44.

What is claimed is:

1. A sidelink transmission apparatus, comprising:
a first transmitting unit configured to transmit first sidelink control information via a physical sidelink control channel; and
a second transmitting unit configured to transmit second sidelink control information and a first transport block via a physical sidelink shared channel, wherein the second sidelink control information or a media access control protocol data unit of the first transport block indicates or carries triggering information used for triggering a second terminal equipment to report sidelink resource information;
wherein the sidelink resource information comprises a sidelink resource set preferred by the second terminal equipment and/or a sidelink resource set not preferred by the second terminal equipment;
wherein the second transmitting unit is further configured to transmit first indication information used by the second terminal equipment for determining the sidelink resource information; and
wherein the first indication information comprises at least one piece of the following or a combination thereof: a position of a starting time of a resource selection window, a position of an ending time of the resource selection window, or the number of sub-channels in a frequency domain occupied by sidelink resources.

2. The apparatus according to claim 1, wherein the triggering information is indicated by afield in the first sidelink control information or the second sidelink control information.

3. The apparatus according to claim 1, wherein the first sidelink control information reserves one or more sidelink resources used by the second terminal equipment for reporting the sidelink resource information.

4. The apparatus according to claim 1, wherein the first indication information is indicated or carried by the first sidelink control information, or is indicated or carried by the second sidelink control information, or is indicated or carried by the media access control protocol data unit of the first transport block.

5. The apparatus according to claim 1, wherein the first transport block only carries information used for indicating the triggering information and the first indication information.

6. The apparatus according to claim 1, wherein the first transport block carries the triggering information, the first indication information, and data towards the second terminal equipment.

7. The apparatus according to claim 1, wherein the apparatus further comprises:
a receiving unit configured to receive the sidelink resource information reported by the second terminal equipment; and
the second transmitting unit transmits the first transport block again according to the sidelink resource information, or transmits a second transport block different from the first transport block.

8. The apparatus according to claim 7, wherein the receiving unit is further configured to receive feedback information transmitted by the second terminal equipment, the feedback information indicating whether the first transport block is correctly received.

9. The apparatus according to claim 8, wherein the feedback information and the sidelink resource information are transmitted together.

10. The apparatus according to claim 9, wherein the feedback information is indicated or carried by first sidelink control information or second sidelink control information or a media access control protocol data unit of a second transport block transmitted by the second terminal equipment.

11. The apparatus according to claim 8, wherein the feedback information is transmitted via a physical sidelink feedback channel, and the sidelink resource information is transmitted via a physical sidelink shared channel.

12. The apparatus according to claim 11, wherein the second transmitting unit transmits the triggering information and the first transport block on a sidelink resource associated with a physical sidelink feedback channel.

13. The apparatus according to claim 1, wherein the second terminal equipment does not transmit the sidelink resource information when the first transport block is correctly received.

14. The apparatus according to claim 1, wherein the first sidelink control information or the second sidelink control information or the media access control protocol data unit of the first transport block indicates or carries second indication information, the second indication information indicating whether the second terminal equipment reports the sidelink resource information when the first transport block is correctly received.

15. The apparatus according to claim 1, wherein the sidelink resource information is used to transmit a second transport block different from the first transport block.

16. A sidelink reception apparatus, comprising:
- a first receiving unit configured to receive first sidelink control information transmitted via a physical sidelink control channel; and
- a second receiving unit configured to receive second sidelink control information and a first transport block transmitted via a physical sidelink shared channel, wherein the second sidelink control information or a media access control protocol data unit of the first transport block indicates or carries triggering information used for triggering a second terminal equipment to report sidelink resource information;

wherein the sidelink resource information comprises a sidelink resource set preferred by the second terminal equipment and/or a sidelink resource set not preferred by the second terminal equipment;

wherein the second receiving unit is further configured to receive first indication information used by the second terminal equipment for determining the sidelink resource information; and wherein the first indication information comprises at least one piece of the following or a combination thereof: a position of a starting time of a resource selection window, a position of an ending time of the resource selection window, or the number of sub-channels in a frequency domain occupied by sidelink resources.

17. The apparatus according to claim 16, wherein the second terminal equipment triggers resource selection or re-selection, and autonomously selects and determines the sidelink resources used for reporting sidelink resource information.

18. The apparatus according to claim 16, wherein the sidelink resource information is carried in the media access control protocol data unit.

19. A communication system, comprising:
- a first terminal equipment configured to transmit first sidelink control information via a physical sidelink control channel, and transmit second sidelink control information and a first transport block via a physical sidelink shared channel, wherein the second sidelink control information or a media access control protocol data unit of the first transport block indicates or carries triggering information; and
- a second terminal equipment configured to receive the first sidelink control information, the second sidelink control information and the first transport block, wherein the triggering information is used for triggering the second terminal equipment to report sidelink resource information;

wherein the sidelink resource information comprises a sidelink resource set preferred by the second terminal equipment and/or a sidelink resource set not preferred by the second terminal equipment;

wherein the first terminal equipment is further configured to transmit first indication information used by the second terminal equipment for determining the sidelink resource information; and wherein the first indication information comprises at least one piece of the following or a combination thereof: a position of a starting time of a resource selection window, a position of an ending time of the resource selection window, or the number of sub-channels in a frequency domain occupied by sidelink resources.

* * * * *